Patented May 27, 1952

2,598,013

UNITED STATES PATENT OFFICE 2,598,013

METHOD OF PRODUCING SULFONYL HALIDES FROM SULFENYL HALIDES

Wayne A. Proell, Chicago, Ill., and Wilbur B. Chilcote, Hammond, Ind., assignors to Standard Oil Company, Chicago, Ill., a corporation of Indiana No Drawing. Application July 26, 1950, Serial No. 176,063

10 Claims. (Cl. 260—543)

1

This invention relates to a novel and improved process for the preparation of certain organic sulfonyl chlorides and bromides. More particularly, it relates to a method for reducing or eliminating the induction period which has been observed in processes for the catalytic oxidation of certain high purity organic sulfenyl chlorides and bromides with a gas containing free oxygen in the presence of nitrogen oxide catalysts.

One object of our invention is to provide an improved process for the preparation of certain organic, particularly non-tertiary hydrocarbon, sulfonyl chlorides. An additional object is to provide a method for reducing or eliminating the induction period which has been observed in processes for the catalytic oxidation of high purity non-tertiary hydrocarbon sulfenyl chlorides or bromides with a gas containing free oxygen in the presence of nitrogen oxide catalysts. Still another object is to provide a process of the general character described, in which process minimal proportions of nitrogen oxide catalysts can be satisfactorily employed. Yet another object of our invention is to provide an improved catalytic process for the oxidation of highly concentrated, unstable alkanesulfenyl chlorides containing at least one alpha-hydrogen atom such as are produced by low temperature chlorinolysis of non-tertiary alkyl disulfides to produce the corresponding alkanesulfonyl chlorides. Another object is also to eliminate the difficultly-controllable $NO_2$ evolution which occurs after a prolonged induction period. These and other objects of our invention will become apparent from the ensuing description thereof.

Non-tertiary hydrocarbon sulfenyl halides having the general formula RSX, wherein R is a non-tertiary hydrocarbon radical, S is sulfur and X is a halogen selected from the group consisting of chlorine and bromine, can be converted to the corresponding sulfonyl halides, $RSO_2X$, by treatment with a free oxygen-containing gas, for example, air or oxygen-enriched air, under substantially anhydrous conditions in the presence of a catalytic proportion of $NO_2$ varying between about 0.05 and about 0.5 part by weight per part by weight of the oxygen in the oxidizing gas stream, at low oxidation temperatures between about $-20°$ C. and about $30°$ C., for example about 20 to about $30°$ C., and partial pressures of oxygen varying from about 0.1 to about 5 atmospheres, the total reaction pressure being ordinarily sufficient to maintain the sulfenyl halide feed stock substantially in the liquid condition in the reaction zone. The above-described process occurs without an induction period when applied to relatively impure charging stocks containing less than about 90 percent by weight of RSX or when applied to highly concentrated RSX charging stocks containing 90–98 percent

2 by weight of RSX, provided that substantially more than 0.5 part by weight of $NO_2$ are employed per part by weight of oxygen in the oxidizing gas stream. Induction periods of considerable length prior to the onset of active oxidation are encountered in processes of the above general description when they are applied to high purity sulfenyl halides containing at least about 90 percent by weight of sulfenyl halide and when not more than about 0.5 part by weight of $NO_2$ are employed per part by weight of oxygen in the oxidant gas stream. Very long induction periods also occur with distilled sulfenyl chlorides even when large amounts of $NO_2$ are used. The impurities in the highly concentrated RSX feed stocks of the present invention are not exactly known but include hydrocarbon disulfides, chlorinated hydrocarbon disulfides and close-boiling saturated hydrocarbons.

It is highly desirable to effect the smooth oxidation of high purity sulfenyl halides while employing minimal proportions of $NO_2$ catalysts, since the use of the relatively gross amounts of $NO_2$ which are required to reduce the induction period results in substantial $NO_2$ absorption in the reaction products, and thus $NO_2$ is released at dangerously high rates after the onset of oxidation, as well as increasing the amount of catalyst to economically undesirable values.

Substantial decomposition of hydrocarbon sulfenyl chlorides, particularly sulfenyl chlorides containing alpha-hydrogen, can occur during the induction period. This fact will be evident from the following data which illustrates the relative thermal instability of ethanesulfenyl chloride at $20°$ C.

| Time, hrs. | Weight percent RSCl |
|---|---|
| 0 | 100 |
| 0.5 | 98.25 |
| 1.0 | 95.8 |
| 1.5 | 92.6 |
| 2.5 | 85.9 |
| 3.5 | 63.9 |
| 4.0 | 52.8 |
| 4.5 | 47.4 |
| 5.0 | 42.45 |
| 6.5 | 34.78 |
| 8.0 | 30.25 |
| 15.33 | 23.2 |

Upon the foregoing considerations it will be apparent that it is extremely desirable to develop a successful process for the oxidation of high purity sulfenyl halides while employing minimal proportions of $NO_2$ catalysts and while avoiding or substantially reducing the induction period, since such an improved process would reduce catalyst requirements, eliminate special problems of catalyst stripping from the reaction products, would avoid the thermal decomposition of thermally unstable sulfenyl halides prior to the onset of oxidation and would permit the employment of reaction equipment at high volumetric efficiency. These desiderata are substantially met by the process which will be described hereinafter.

Briefly, we have found that the induction period in processes of the above-described type can be substantially reduced or entirely eliminated by adding between about ½ and about 20 percent by weight, based on the RSX feed stock, of a primer consisting essentially of a partially oxidized sulfenyl halide containing between about 2 and about 50 percent of the amount of oxygen theoretically required to convert the entire sulfenyl halide content of said primer to sulfonyl halide. As will be recounted in more detail hereinafter, the primer can be produced by the partial oxidation of relatively impure sulfenyl halides or by the partial oxidation of a high purity (at least 90 weight percent) sulfenyl halide, in the latter case encountering an induction period and relatively inefficient oxidation which can, however, be tolerated since only a small proportion of primer is necessary to induce oxidation of large volumes of high purity sulfenyl halides. The primer also can be made by selecting a portion of an initiated oxidation reaction product such as herein described, and reserving it for the next oxidation.

The basic catalytic oxidation process to which the present novel process can be applied as an improvement is described and claimed in a copending application for Letters Patent, Serial No. 176,062, and now U. S. Patent No. 2,573,674, issued Nov. 6, 1951, filed of even date herewith by Chester E. Adams and Wayne A. Proell. The basic oxidation process is particularly applicable to non-tertiary saturated hydrocarbon sulfenyl chlorides and bromides. Also, numerous aromatic sulfenyl chlorides and bromides, as well as substituted aromatic derivatives such as nitro-derivatives thereof, have been prepared and may be employed as charging stocks. In general, aromatic sulfenyl chlorides and bromides are considerably more stable, thermally, than aliphatic sulfenyl chlorides and bromides. More particularly, aromatic hydrocarbon sulfenyl chlorides and bromides are considerably more stable, thermally, than saturated hydrocarbon sulfenyl chlorides and bromides, particularly species of the latter category, which are non-tertiary, i. e. which contain hydrogen (alpha-hydrogen) linked to the carbon atom which is bound to the sulfur atom of the saturated hydrocarbon sulfenyl chloride or bromide.

Because of their great thermal instability, non-tertiary saturated hydrocarbon sulfenyl chlorides or bromides, e. g., ethanesulfenyl chloride or cyclohexanesulfenyl chloride, cannot be successfully oxidized to corresponding sulfonyl halides by conventional technique, employing hot concentrated nitric acid as the oxidant and glacial acetic acid as the reaction medium.

Examples of suitable aromatic sulfenyl chloride and bromide charging stocks are those in which the aromatic radical is a hydrocarbon radical, for example, phenyl, tolyl, xylyl, cumyl, ethylphenyl, naphthyl, methylnaphthyl, xenyl and the like. The aromatic radical which is linked to the sulfur in the sulfenyl chloride or bromide charging stock may also contain substituents such as halogen, nitro, carboxyl or other atoms or groups.

Examples of non-tertiary saturated hydrocarbon sulfenyl chloride and bromide charging stocks are those in which the hydrocarbon radical is alkyl, e. g., methyl, ethyl, n-propyl, isopropyl, n-butyl, 2-methylpropyl, neopentyl, n-amyl, isoamyl, n-hexyl, n-octyl, isooctyl, n-decyl, n-dodecyl, n-tetradecyl, n-hexadecyl, n-octadecyl; non-tertiary cycloalkyl, e. g., cyclopentyl, cyclohexyl, ortho- or para-methylcyclohexyl, 2- or 3-methylcyclopentyl, bornyl; non-tertiary aralkyl, e. g., benzyl, phenethyl and the like. The saturated hydrocarbon group may be substituted by non-reactive substituents such as halogen or other groups.

The low temperature ($-50°$ C. to $30°$ C.) chlorinolysis of non-tertiary saturated hydrocarbon disulfides with dry chlorine to produce corresponding sulfenyl chlorides is specifically described and claimed in a copending application for U. S. Letters Patent, Serial No. 176,061, filed of even date herewith by Wilbur B. Chilcote and Bernard H. Shoemaker. The synthesis of tertiary alkanesulfenyl chlorides is extremely difficult to effect by low temperature chlorinolysis of the corresponding disulfides and produces only very low yields, of the order of 5 weight percent based on disulfide feed stock.

The basic catalytic oxidation process can be applied to individual sulfenyl chlorides or bromides or to mixtures of various sulfenyl chlorides and/or bromides. A particularly desirable application of the basic oxidation process is to a mixture of non-tertiary alkanesulfenyl chlorides which can be obtained by low temperature chlorinolysis of mixtures of non-tertiary alkyl disulfides, such as are commercially produced by the treatment of naphthas by means of the well-known caustic-solutizer extraction processes and catalytic oxidation of the resultant mercaptide-containing caustic solutions with air or oxygen. Low temperature chlorinolysis of these disulfide mixtures produces a mixture of alkanesulfenyl chlorides containing predominantly methyl, ethyl, n-propyl and isopropyl groups.

The basic catalytic oxidation process can be conducted at temperatures between about $-20°$ C. and about $30°$ C. Usually, it is convenient to operate at temperatures between about $5°$ C. and about $15°$ C. and temperatures between about $10°$ C. and about $15°$ C. are preferred, since at these temperatures the rate of oxidation of the charging stock is substantially greater than the rate of decomposition of even highly unstable charging stocks such as methanesulfenyl chloride, ethanesulfenyl chloride and the like. However, it will be apparent that when more stable charging stocks are employed, for example, phenylsulfenyl chloride or o-nitrophenylsulfenyl chloride, higher reaction temperatures between about $20°$ C. and about $40°$ C. can be conveniently employed.

The oxidant in the present process is oxygen, which may be employed as such. However, it is preferable to employ relatively dilute oxygen streams, for example as in air, flue gases containing desired proportions of oxygen, mixtures of oxygen with $CO_2$ or gaseous hydrocarbons such as methane or ethane, and the like.

The initial partial pressure of oxygen in the oxidation reaction zone may be varied between about 0.1 and about 6 atmospheres and is usually selected between about 0.1 and about 0.2 atmospheres. It will be apparent that the oxidation rate will increase with increasing oxygen partial pressures in the reaction zone under otherwise constant reaction conditions, particularly catalyst concentration. The total pressure in the oxidation reaction will usually vary between about 15 and about 80 p. s. i. g. The catalytic oxidation process can be conveniently effected at substantially atmospheric pressure, employing air as the oxidant gas stream.

The essential catalyst employed in the present process is nitrogen dioxide. Nitrogen dioxide concentrations between about 0.05 and about 0.5 part by weight of $NO_2$ per part by weight of oxygen are employed. The rate of oxidation tends to increase with increasing $NO_2$ concentration in the reaction zone, other reaction conditions remaining constant.

It will be apparent that in lieu of, or in addition to $NO_2$, we can employ materials which will yield $NO_2$ in the oxidation reaction zone under the reaction conditions. Thus, for example, as is well-known, $NO_2$ is ordinarily in equilibrium with $N_2O_4$ and it will be apparent, therefore, that $N_2O_4$ can be employed in the present process in addition to $NO_2$ or in lieu thereof. It is also known that nitric oxide, NO, in the presence of oxygen, is in equilibrium with $NO_2$, which, in turn, is usually in equilibrium with $N_2O_4$. Therefore, nitric oxide can be employed as the source of $NO_2$ in the oxidation zone in the process of the present invention. Likewise, $N_2O_3$ is usually in equilibrium with both NO and $NO_2$. In view of these and similar considerations it will be apparent, therefore, that in lieu of or in addition to $NO_2$, we may employ NO, $N_2O_3$, $N_2O_4$ and $N_2O_5$. Although it is well-known that nitric acid can decompose under certain conditions to yield $NO_2$, ordinarily we do not desire to employ nitric acid as a source of catalyst, since its decomposition also yields water, which leads to undesirable side reactions such as hydrolysis of the charging stock and of the desired reaction product.

The $NO_2$ serves as a catalyst in the oxidation process and can, for the most part, be recovered unchanged upon completion of the reaction. Upon completion of the desired reaction, catalyst which is either physically absorbed in the liquid reaction product or present in small proportions therein as nitrosylsulfonic acid, can be distilled out, washed out with water, or stripped therefrom by a stream of stripping gas such as nitrogen, air, $CO_2$ or the like, and thereafter recovered by conventional methods and reused. Catalyst present in the effluent gas stream during the operation of the present process can, likewise, be recovered by conventional means and recycled for use in the present process.

The reaction period will depend, to a considerable extent, upon the extent of oxidation sought to be effected and upon the other reaction conditions such as temperature, oxygen concentration, catalyst concentration, reactivity of the particular charging stock, intimacy of contact, etc. Ordinarily, substantial oxidation can be effected within reaction periods selected within the range of about 60 to about 600 minutes. It will be apparent that desirable reaction periods can readily be determined by small scale runs in specific instances.

The oxidation process may be carried out batchwise, continuously or semi-continuously. The oxidation process may also be effected in a number of stages with or without product separation between stages. The oxidation reaction may be effected in conventional reaction kettles or autoclaves, or in a tubular convertor or contacting tower. A suitable form of reactor is a vertical tower provided with contacting means such as bubble cap trays or with packing such as ceramic bodies or fiber glass mats. Concurrent contacting of liquid sulfur compound feed stock and the oxidizing gas stream proceeds efficiently in the types of reaction tower just described; the liquid feed is passed downwardly through the tower with a stream of oxidizing gas, all of which may be admitted at a point near the top of the tower or in aliquot portions at vertically spaced points along the tower. A tubular reactor equipped for spaced injection of oxidizing gas into a flowing stream of liquid or atomized feed stock and oxidation products may also be employed; a reactor of this type permits fine control of the extent of oxidation.

The following operating examples are included for the purpose of illustrating specific applications of the invention and not with the intent of delimiting the same.

*Example 1*

A distilled sample of ethanesulfenyl chloride analyzing 95 percent ethanesulfenyl chloride (sample weight, 51.6 g.; 100 percent $C_2H_5SCl$, 49.0 g.) was oxidized in a glass, concurrent flow, air-lift gas-liquid reactor, essentially as shown in Figure 2 of Wayne A. Proell, U. S. Patent 2,489,316. The impurities in the ethanesulfenyl chloride sample comprised essentially chlorinated ethyl disulfide. In this equipment, the oxidant gas stream raises the liquid charging stock through an indirectly cooled column into the upper portion of a vertical reactor packed with glass beads, the gas-liquid mixture passes down through the packed reactor and is separated at the bottom of the packed section, whereafter the liquid is recycled through the gas lift and the spent oxidant gas is metered and discarded. One cubic foot of air per hour and 10 weight percent $NO_2$, based on the total gas stream, were employed at 18 to 22° C. No perceptible oxidation of the ethanesulfenyl chloride occurred in 140 minutes. In an attempt to start the oxidation reaction, 5 cc. of ethyl disulfide were added to the reactor charge and flow of the oxidant gas was continued at the same rate for another 30 minutes without onset of oxidation. Thereupon 1 cc. of ethanesulfonic acid was added to the reactor charge and the gas rate continued as before for an additional 30 minutes without onset of oxidation. At this point 1 cc. of water was added to the reactor charge and the gas flow was continued at the same rate as before for an additional 30 minutes without evidence of oxidation occurring. Distillation of the reactor contents thus obtained gave no evidence of ethanesulfonyl chloride production.

A primer was then prepared as follows: The reactor described above was charged with 44.8 g. (0.366 mol) of dry ethyl disulfide. This charge was treated with dry chlorine and nitrogen at 20–23° C. for 126 minutes, the flow of chlorine being gaged so that 0.206 g. (0.0029 mol) of chlorine per minute was admitted to the reactor. After the amount of chlorine theoretically required to convert the ethyl disulfide to ethanesulfenyl chloride had entered into reaction, the contents of the reactor were flushed with dry nitrogen and the product was then oxidized with a mixture of 5 percent $NO_2$ and 95 percent dry air at 10–30° C. and atmospheric pressure until 6.5 percent of the amount of oxygen theoretically required to convert the ethanesulfenyl chloride to ethanesulfonyl chloride had been absorbed.

The primer (6.7 g.) was added to 51.9 g. of distilled ethanesulfenyl chloride having a purity of 97 weight percent, prepared by low temperature chlorination of ethyl disulfide. The mixture thus prepared was placed in a gas-lift reactor as described above and was treated with a mixture of 5.5 weight percent $NO_2$ and 94.5 weight percent dry air, employing an average gas rate of 1.5 cubic feet per hour. Oxidation began immediately and proceeded smoothly, accelerating to a peak oxygen absorption rate of 84 percent after 181 minutes on stream. Oxidation was completed after 220 minutes on stream. The temperature at all times during the oxidation was maintained between 20 and 27° C. by heat removal through the indirect heat exchanger surrounding the gas-lift tube employed in conjunction with the reactor. The reaction product was then removed to a vacuum still wherein dissolved $NO_2$ was readily flashed off by applying a vacuum. Distillation of the reaction product was carried out at 8 to 10 mm. of mercury with a maximum pot temperature of 85° C. Ethanesulfonyl chloride was obtained as a distillate boiling in the range of 174–184° C. at one atmosphere (55–66° C. at 10 mm. of mercury), $n_D^{20.1}$ 1.4543, in the amount of 65.6 g. (0.51 mol). Analysis of the ethanesulfonyl chloride product showed the presence therein of 24.65 weight percent sulfur and 27.5 weight percent chlorine. The ethanesulfonyl chloride product was reacted with p-toluidine to produce the p-toluide, M. P., 79° C. The yield of ethanesulfonyl chloride was 84.4 percent of theory. The bottoms obtained in the vacuum distillation weighed 9.8 g. and were analyzed as ethanesulfonic acid (0.081 mol).

*Example 2*

Undistilled ethanesulfenyl chloride (64.3 g.) was charged to the reactor described in Example 1 and treated with a gas consisting of dry air and $NO_2$, the concentration of $NO_2$ in the gas being 5 weight percent, at the rate of about 0.6 cubic foot per hour (standard conditions) for 200 minutes. During an initial period of 10 to 15 minutes no oxidation occurred, but thereafter oxidation proceeded with 10 to 50 percent oxygen removal from the oxidizing gas stream. The temperature of the reacting liquid was maintained between 5 and 10° C. During the oxidation two samples were withdrawn, of which the first contained approximately 0.3 percent of the theoretical amount of oxygen required to convert the charging stock to ethanesulfonyl chloride and the second sample contained 41 percent of the theoretical oxygen content of ethanesulfonyl chloride. The second sample was withdrawn at the end of 200 minutes of treatment.

Distilled ethanesulfenyl chloride of 97.3 percent purity (41.9 g.; 0.434 mol) was charged to the same reactor and treated for 25 minutes at 5 to 7° C. with a dry air-$NO_2$ stream containing 5 weight percent of $NO_2$ at the rate of 0.65 cubic foot per hour (standard conditions). No oxidation occurred. The primer containing 0.3 weight percent of oxygen was then introduced into the reactor in the amount of 2.1 g. and the oxidant gas flow was continued an additional 25 minutes without onset of oxidation.

Then 2.1 g. of the primer containing 41 percent of oxygen were introduced into the reactor, whereupon oxidation began at once and proceeded smoothly to a peak oxygen absorption of 51 percent from the oxidant gas stream after about 170 minutes on stream. The temperature of the reacting liquid was maintained between 3 and 7° C. Oxidation was completed in 420 minutes. The reaction products were removed to a vacuum still wherein $NO_2$ was flashed by gentle vacuum. The remaining products were distilled at 10 mm. mercury pressure. Ethanesulfonyl chloride boiling at 57–58° C./10 mm. (176–178° C. at 1 atmosphere), $n_D^{20}$ 1.4542 and having the density of 1.36 at 20° C. was obtained in the amount of 45.4 g. (0.353 mol). Titration of the high boiling vacuum distillation bottoms indicated an acidity therein equivalent to 7.64 g. of ethanesulfonic acid.

Copending Serial No. 176,064 of even date herewith, filed by Wayne A. Proell et al., relates to a one-stage process for preparing sulfonyl chlorides by treatment of non-tertiary hydrocarbon disulfides with oxygen and chlorine in the presence of $NO_2$ catalyst.

Having thus described our invention, what we claim is:

1. In a process for the oxidation of a non-tertiary saturated hydrocarbon sulfenyl halide having the general formula RSX wherein R is a non-tertiary hydrocarbon radical and X is selected from the class consisting of chlorine and bromine, said sulfenyl halide having a purity of at least 90 percent by weight, with a gas containing free oxygen and a catalytic quantity of $NO_2$, said quantity being between about 0.05 and about 0.5 part by weight per part by weight of said oxygen, at a temperature between about −20° C. and about 30° C. under substantially anhydrous conditions, in which process an induction period occurs before the onset of active oxidation, the improvement of substantially reducing said induction period which comprises adding to said sulfenyl halide between about ½ and about 20 percent by weight thereof of a primer consisting essentially of a partially oxidized non-tertiary saturated hydrocarbon sulfenyl halide containing between about 2 and about 50 percent of the oxygen theoretically required to convert the entire sulfenyl halide content of said primer to the corresponding sulfonyl halide.

2. The process of claim 1 wherein said sulfenyl chloride is prepared by low temperature chlorinolysis of a non-tertiary saturated hydrocarbon disulfide.

3. The process of claim 1 wherein the sulfenyl halide is ethanesulfenyl chloride and wherein the primer is a partially oxidized ethanesulfenyl chloride.

4. The process of claim 1 wherein the oxidation reaction temperature is between about 5° C. and about 15° C.

5. The process of claim 1 wherein the non-tertiary saturated hydrocarbon sulfenyl halide which is oxidized is ethanesulfenyl chloride.

6. The process of claim 1 wherein the non-tertiary saturated hydrocarbon sulfenyl halide which is oxidized is methanesulfenyl chloride.

7. The process of claim 1 wherein the non-tertiary saturated hydrocarbon sulfenyl halide which is oxidized is a propanesulfenyl chloride.

8. The process of claim 1 wherein the non-tertiary saturated hydrocarbon sulfenyl halide which is oxidized is a butanesulfenyl chloride.

9. The process of claim 1 wherein the non-tertiary saturated hydrocarbon sulfenyl halide which is oxidized is a cyclohexanesulfenyl chloride.

10. The process of claim 1 wherein said primer is a partially oxidized ethanesulfenyl chloride.

WAYNE A. PROELL.
WILBUR S. CHILCOTE.

No references cited.